United States Patent Office 3,043,031
Patented July 10, 1962

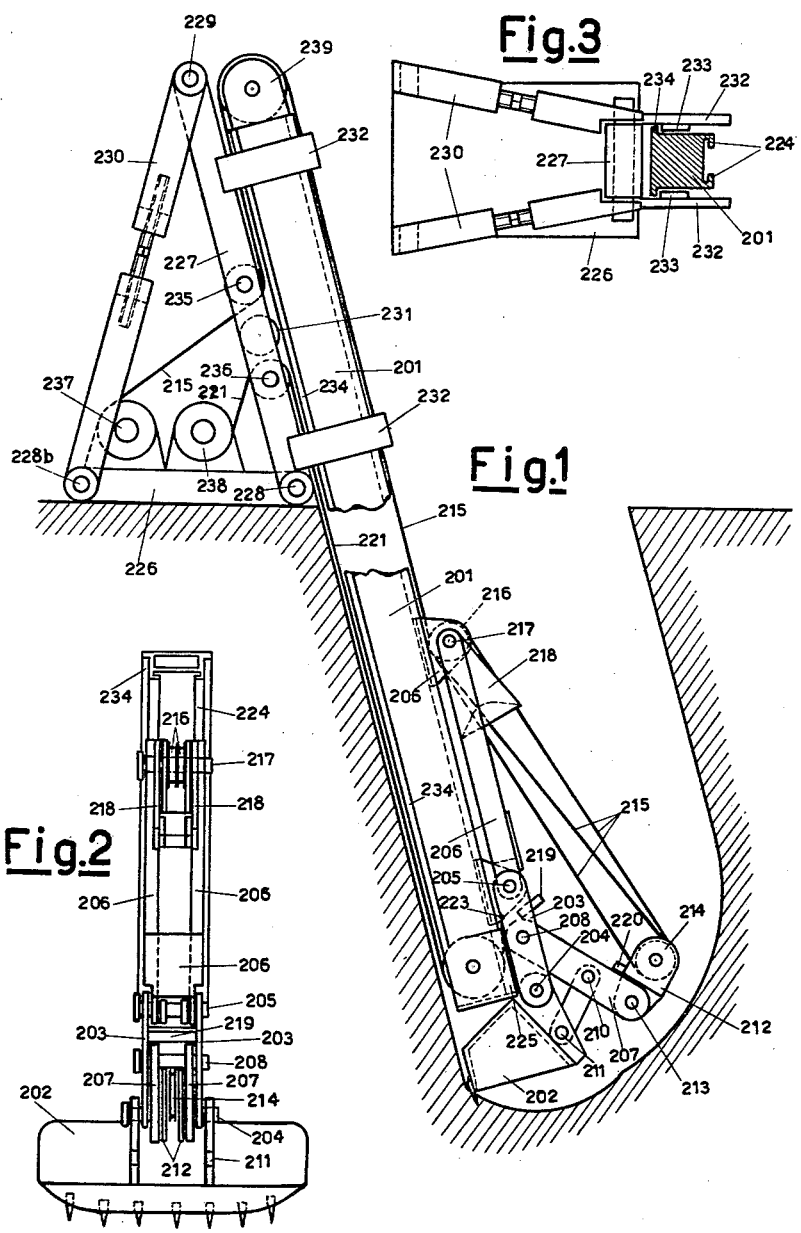

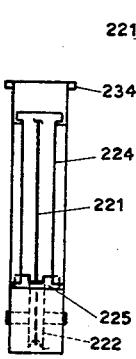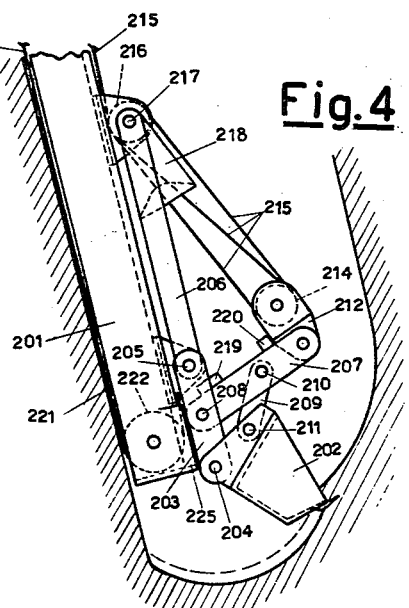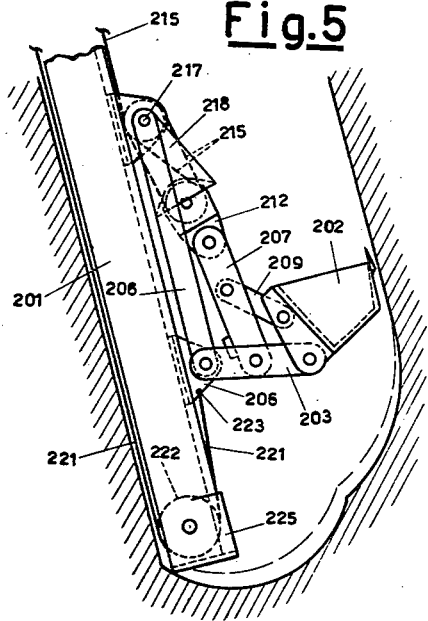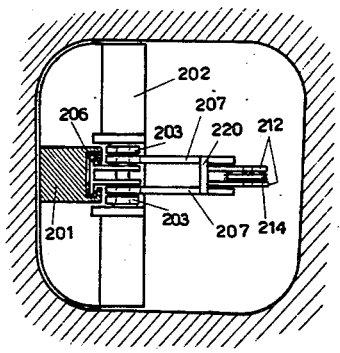

3,043,031
RIGID-GUIDE EXCAVATOR PARTICULARLY ADAPTED FOR THE DIGGING OF TRENCHES WITH VERTICAL WALLS
Ignazio Failla, Via Visconti Di Modrone 19, Milan, Italy
Filed June 14, 1960, Ser. No. 35,985
Claims priority, application Italy Apr. 22, 1960
7 Claims. (Cl. 37—103)

It is an object of the present invention to provide some improvements in the excavator described in the U.S. patent application Serial No. 815,441 filed on June 25, 1959, now Patent No. 3,021,623.

It is an object of the improvements first of all to enable the excavator shovel to cover an angle of rotation around its centre of rotation, greater than foreseen in the embodiment described in the preceding patent application, so as to render particularly effective the excavation below the slide guide; in fact, the greater the amplitude of said angle, the more will it be possible to improve the angle of attack of the shovel on the ground.

A comparatively great angle covered by the shovel would involve, according to the preceding patent application, a correspondingly great angular stroke of the arm fixed thereto, which controls it, and consequently not only a considerable variation of the torque, due to the considerable variation of the distance of the line of action from the centre of rotation common to the shovel and to the arm rigid thereto, but also, in the case of a number of rotations around a plurality of centres, the impossibility of supplying the force of traction a comparatively big moment with respect to the successive centre or rotation.

Those difficulties are obviated by rendering the shovel rotatable around a pivot different and spaced from the pivot around which the arm rotates, and by interposing between the arm and the shovel a kinematic connection in which the angle of rotation of the shovel is greater than the angle of rotation of the arm.

Said kinematic connection may be constituted for instance by a connecting rod hinged on the arm and on the shovel at points selected in such a way that the product of the moment of the force of traction with respect to the pivot of rotation of the arm, by the moment of the force transmitted by the connecting rod with respect to the pivot of rotation of the shovel keeps approximately constant or at any rate little variant for the whole working stroke; in that way the rope of traction is subjected to an almost constant stress notwithstanding the variation of its arm of action. Then from the fact that the angle of rotation of the arm is comparatively small also for comparatively wide rotations of the shovel it comes that situations are avoided wherein the effective component of the force of traction represents a small fraction thereof, and the device is realizable rationally with a length comparatively small of the arm, which permits and enables to dig pits of transversal dimensions approximately equal to one another.

Another improvement provided by the present invention is that represented by the shape with more or less rounded edges given the excavating border of the shovel, which permits the excavation of pits of cross-section and chamfered edges particularly favourable, and which also can permit, together with the already mentioned limited length of the arm, the excavation of pits with circular section.

A further improvement of the tooling described in the preceding application is that consisting in rendering inclinable from the vertical, the rigid guide, in such a way as to enable the digging of pits with axis inclined or orientated at will.

The invention will be more fully understood with the aid of the enclosed drawings wherein:

FIG. 1 shows the hole formed by the shovel and its members, guide, frame, in course of digging and with the shovel in initial position;

FIG. 2 shows a front view of the shovel and of its members;

FIG. 3 shows a top view of the inclinable frame;

FIG. 4 shows the shovel and its members at a point of its movement;

FIG. 5 shows the shovel and its members at a second point of its movement;

FIG. 6 shows a particular of the olwer end of the guide;

FIG. 7 shows a normal section of the axis of the pit with a view from top of the shovel.

In particular in the figures is indicated by 201 the rigid guide; by 202 the shovel; by 203 a first arm pivoted at 204 to the shovel 202 and pivoted at 205 to the slide 206 connected slidably to the guide 201; by 207 a second arm pivoted at 208 on the arm 203 and connected through the connecting rod 209 and the pivots 210 and 211 with the shovel 202; by 212 a support, rotatable on the pivot 213 at the free end of the arm 207, of the tackle 214 with $n$ throats whereon is wound up $n$ times a rope 215; by 216 a second tackle with $n+1$ throats whereon is wound up the rope 215, coming from top; by 217 the pivot of the tackle 216 carried at the top end of the slide 206; by 218 two stopping sidewalls for the support 212 of the tackle 214; by 219 the stopping abutment for the rotation of the arm 207 on the arm 203; by 220 the stopping abutment for the rotation of the support 212 with respect to the arm 207; by 221 a second rope coming from top and behind the guide; by 222 a transmission tackle for the rope 221; by 223 the fixed end of the rope 221 at the slide 206; by 224 the sliding guides for the slide 206 on the vertical guide 201; by 225 the lower end-of-stroke stop for the slide 206 on the guide 201; by 226 the basement of the frame; by 227 the front yard of the frame; by 228 the lower pins of the yard and of the legs of the frame; by 229 the upper pivot; by 230 the two adjustable legs of the frame; by 231 a sliding roll of the guide 201; by 232 slide-carrier arms of the slide 201; by 233 the slides destined to slide against the sidewalls and the longitudinal projection 234 of the guide 201; by 235 a transmission tackle; by 236 a second transmission tackle; by 237 a drum of winch; by 238 a second winch drum; by 239 a transmission tackle. Operation is as follows:

By acting from top on the rope 221 one lifts the guide 201 slidable on the roll 231 of slides 233, thereby constraining contemporaneously the slide 206 to the lower end-of-stroke 225: by gravity, the rope 215 being left free to unwind, the shovel 202 assumes the position indicated in FIGURE 1, with its teeth turned downwards and flush with the rear wall of the guide 201. By releasing then the rope 221, there is caused the descent of the assembly into the relative positions indicated in FIGURE 1 and the penetration into the ground of the teeth of the shovel.

On locking now the rope 221, one acts by traction at the rope 215 thereby obtaining at first the effect of rotating the support 212 as far as against the abutment 220, with a relative increase of the useful arm and, therefore the rotation of the arm 207 around the pivot 208, with respect to the arm 203. The pivot 208 is placed in an intermediate position between the pivots 205 and 204 of the arm 203; moreover the shovel, pivoted at 204 at the arm 203 is connected through the connecting rod 209 with the arm 207; the mutual ratio of the lengths of the following 204—208; 208—210; 210—211; 211—204; with one another and with respect to the segments 205—208 and 203—204 provides the possibility of obtaining that to a given angular rotation of the tip of the shovel there corresponds an equal or different rotation of the arm 207; in our case the rotation of the arm 207 should be smaller than the rotation of the tip of the shovel because, in addition to what has already been set forth, in that way one obtains that although beginning the movement with the tackle 214 fairly lifted with respect to the bottom of the excavation, in the final position the rope 215 is still rather far from the second centre of rotation 205; it renders possible, moreover, that for any resistance met of the tip of the shovel in the course of rotation, the arm 203 pivoted at 205 is always pushed against the guide 201 which in turn contrasts with its rear part against the ground, it renders possible finally to obtain that in the course of the rotation of the arm 207 the moment of the forces acting upon the shovel keeps almost constant, for the amplitudes of rotation which are of interest in practice.

On having effected, as said, the rotation, the arm 207 comes to contrast with the end-of-stroke abutment 219 (FIG. 4). The prosecution of the action of the rope 215 causes the rotation of the shovel-arms-connecting rod etc. assembly around the pivot 205, whereby the shovel tip completes its loading movement. The further action of the rope 215 after the time at which the shovel tip has attained the line normal to the guide for the pivot 205, causes the detaching of said tip from ground and, therefore, after a short path, the resting of the support 212 in the stopping sidewalls 218.

If now one wants to extract from the pit the shovel for discharge, one releases the rope 221, which during all the above said operations had remained locked, while one prosecutes the actions of traction from top of the rope 215, thereby obtaining the result that while the guide 201 rests on the bottom of the excavation, the slide 206 in sliding in the guide 201 in the interior of the sliding guides 224 rises again together with the whole assembly (in the position of FIG. 5) to the surface, where discharge thereof occurs by conventional means. The further stage of excavation is obtained by lowering into the bottom of the excavation the slide 206 with the assembly arranged as in FIG. 3 while making it slide by means of the rope 215 on the guide 201 and then lifting the guide 201 with the rope 221 and repeating the already described operations.

The horizontal section of the excavation so obtained, limiting the length of the arm 207 to sizes comparable with the width of the shovel, can be maintained in the most suitable shape for a pit which is the equilateral one. Moreover, by inclining the yard 227 of the frame by effect for instance of a variation of the length of the legs 230, it is possible to obtain pits with inclined axis with respect to the vertical.

The guide 201 can be decomposed into various elements of limited length, to be joined with one another with the progressing of the excavation.

I claim:

1. An excavator comprising a support, an elongated guide disposed in vertical relation along side the support, means connecting the guide to the support for vertical sliding movement, a slide carried by the guide for vertical sliding movement relative to said guide, an excavating shovel, a first arm pivoted at one end to the slide and at its other end to the shovel, a second arm pivotally attached at one end to the first arm intermediate the ends of the first arm, means pivotally connecting the second arm to the shovel, means connected between the other end of the second arm and the slide for effecting swinging movement of the shovel and means carried by said support and connected to said slide for raising and lowering the same.

2. An excavator comprising a support, an elongated guide disposed in vertical relation along side the support, means connecting the guide to the support for vertical sliding movement, a slide carried by the guide for vertical sliding movement relative to said guide, an excavating shovel, a first arm pivoted at one end to the lower end of the slide and at its other end to the shovel, a second arm pivotally attached at one end to the first arm intermediate the ends of the first arm, a connecting rod pivotally attached to the second arm intermediate the ends of the second arm and pivotally attached to the shovel at a point spaced from the pivotal attachment of the first arm to the shovel, a supporting member pivoted to the second arm at the other end thereof, a tackle mounted on the supporting member, a tackle mounted on the upper end of the slide, cable means connecting said tackles and winch means on the support to which the cable means are connected.

3. An excavator as claimed in claim 2, wherein abutment means for said supporting member is mounted on the second arm and abutment means for said second arm is mounted on the first arm thereby limiting the pivotal movement of the supporting member relative to the second arm and the second arm relative to the first arm.

4. An excavator as claimed in claim 2, wherein stop means for the slide is mounted on the lower end of the guide so as to limit the downward movement of the slide on the guide.

5. An excavator as claimed in claim 2, wherein the excavating profile of the shovel is of curved shape.

6. An excavator as claimed in claim 2, wherein the guide is inclinable with respect to the vertical.

7. An excavator as claimed in claim 2, wherein the guide is composed of a number of elements of limited length to be joined with one another as the excavation progresses.

References Cited in the file of this patent

UNITED STATES PATENTS

| | | |
|---|---|---|
| 1,470,221 | Freeman | Oct. 9, 1923 |
| 1,962,363 | Reimel et al. | June 12, 1934 |
| 2,153,557 | Grenier | Apr. 11, 1939 |

FOREIGN PATENTS

| | | |
|---|---|---|
| 34,420 | Denmark | Apr. 8, 1925 |